Jan. 7, 1964 W. D. VOELKER 3,117,171
METHOD OF MOLDING A FOAMED SANDWICH STRUCTURE
FREE OF AIR POCKETS
Filed April 11, 1961 2 Sheets-Sheet 1
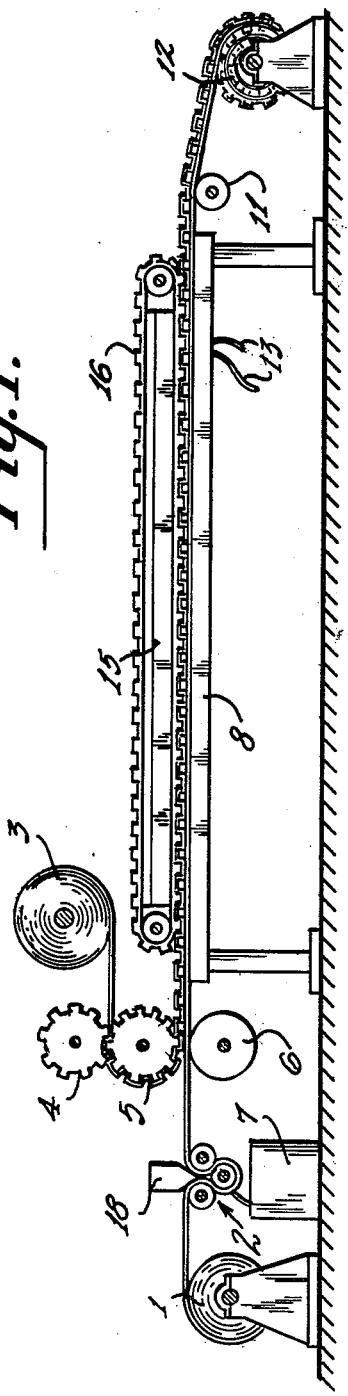
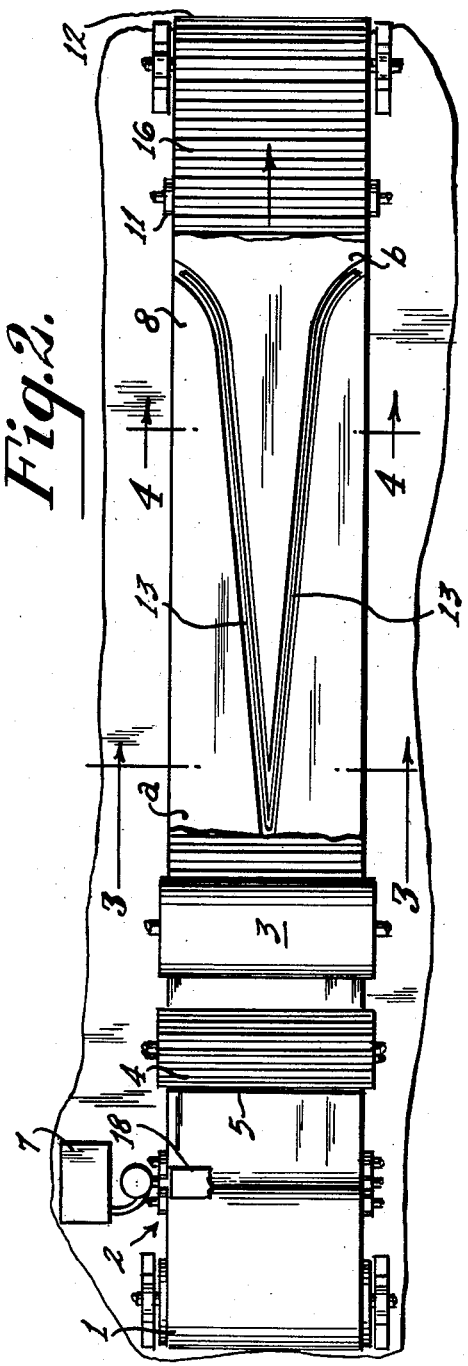
INVENTOR.
Walter D. Voelker
John R. Eubank
ATTORNEY Jan. 7, 1964 W. D. VOELKER 3,117,171
METHOD OF MOLDING A FOAMED SANDWICH STRUCTURE
FREE OF AIR POCKETS
Filed April 11, 1961 2 Sheets-Sheet 2
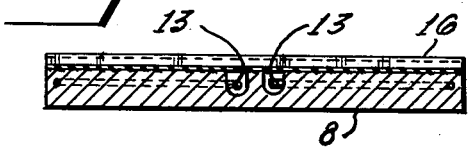
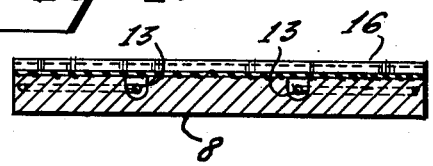
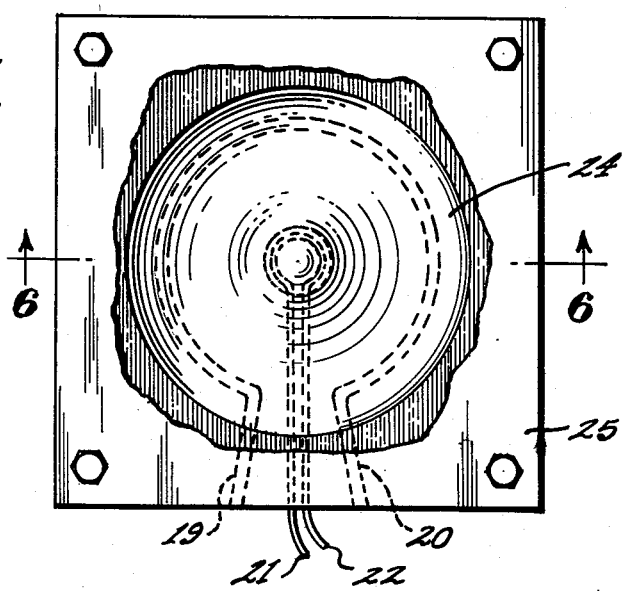
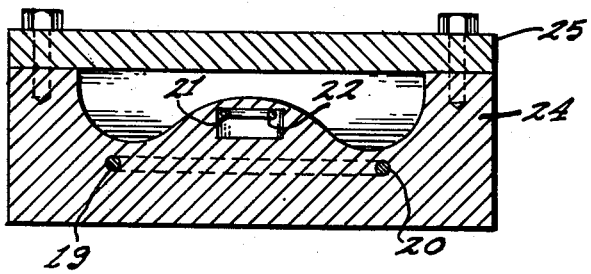
INVENTOR.
Walter D. Voelker
BY John R. Eubank
ATTORNEY.

United States Patent Office 3,117,171
Patented Jan. 7, 1964

3,117,171
METHOD OF MOLDING A FOAMED SANDWICH STRUCTURE FREE OF AIR POCKETS
Walter D. Voelker, Philadelphia, Pa., assignor to Union Carbide Corporation, New York, N.Y., a corporation of New York
Filed Apr. 11, 1961, Ser. No. 102,261
2 Claims. (Cl. 264—47)

This invention relates to the manufacture of foamed products and particularly to the prevention of unintended cavities therein.

Heretofore many attempts have been made to produce advancing sheets containing foamed plastic materials on a high speed production basis but great difficulty has been experienced when the rising foam entraps air causing air pockets or surface cavities which destroy the normal physical properties and appearance of the finished product. Entrapment of pockets of air is a particularly serious problem in continuous processes in which self-foaming mixtures (e.g. a mixture of polyols, diisocyanates, water and catalyst) are coated on one surface and subsequently foams and rises until it contacts another surface. If the rising foam contacts the opposing surface in an irregular random fashion, enclaves of air are entrapped.

In accordance with the present invention, the foaming rate of various sections of a surface coated with a foam-forming mixture is controlled in such a manner as to expel air systematically, thereby preventing any entrapment of air in the finished piece.

The nature of the invention is further clarified by reference to the accompanying drawings.

FIGURES 1 through 4 diagrammatically illustrate apparatus for continuously manufacturing corrugated paper containing at least a partial core of plastic foam. FIGURE 1 is a side view. FIGURE 2 is a top view, partly in section. FIGURES 3 and 4 are cross sectional views taken at 3—3 and 4—4 respectively of FIGURE 2.

FIGURES 5 and 6 are schematic views of a mold in which the rate of foaming is controlled so that a uniform product free of unwanted air entrapment is obtained.

In the method illustrated in FIGURES 1-4 a foamable composition is prepared by any of the customary methods, as for example by mixing a polyol resin with a toluene diisocyanate and water, and this composition is coated as a thin film on a lower sheet material fed continuously toward a withdrawal zone, a second flat or formed sheet material is advanced at the same speed and at a predetermined spacing above the lower coated sheet material, and heat is applied to the combination in such a manner that the heat is primarily concentrated first at the middle of the advancing coated sheet, thereby accelerating the foaming action of such middle area so that the foam in this section will expand more rapidly than in other areas and will contact the opposing surface before the foam expands as much in other sections, thus progressively displacing air sidewardly.

In certain embodiments of this invention, the temperature of adjacent sections of the foamable coating is controlled with the assistance of exothermic heat from the foamed sections so that a temperature front advances progressively, thereby inducing these sections to foam in sequence progressing away from the initially foamed sections so that these sections in rising will contact the opposing surface in sequence progressively away from the initial contact so that air originally between the surfaces is progressively expelled away from the section of initial contact of the rising foam toward a desirable vent.

In order to more fully illustrate the invention, the following examples are included. These examples are intended to be illustrative only and not as limitations on this invention.

*Example 1*

An apparatus is shown in FIGURE 1 in which sheet material 1 is drawn progressively from a roll forwardly toward a take-up roll 12. The sheet material 1 is drawn through an applicator 2 in which the top side of the sheet is uniformly coated with a reactive foam producing composition. Each component of the composition may be pumped at a predetermined rate through a proportionating apparatus 7 and thence through a mixing head 18 into the applicator 2 which meters out the film of predetermined thickness onto the sheet material. A sheet material 3 is drawn from a feed roll by corrugator rolls 4 and 5 and continues around roll 5 to the position opposite pressure roll 6. The corrugator roll 5 presses that portion of sheet material 3 on the outside of the corrugator roll teeth against the coated surface of sheet material 1, so that the major portion of the composition in the areas so contacted is forced to move to the immediately adjacent area where sheet material 3 does not contact sheet material 1. Pressure roll 6 is adjusted so that the coating at the interface where sheet material 3 contacts sheet material 1 is reduced to a film about .0001 inch to .001 inch in thickness and thereafter acts as an adhesive to bind together sheets 3 and 1 without having any significant tendency to foam.

As sheets 3 and 1 are advanced forwardly by the action of take-up roll 12 they slide on supporting plate 8 in which is embedded an electrical heating element 13 so situated that it heats sheet 1 midway between the sides of the sheet. The heat penetrating sheet 3 raises the temperature of the immediately adjacent coating material, inducing foaming at that section prior to foaming of the coating material in other parts of the "tunnel" formed by the corrugation. Once foaming is induced the exothermic heat of the reaction will progressively continue the foaming action until the coating material on sheet 1 has foamed up and contacted sheet 3. To induce controlled progressive foaming at a more rapid rate than provided by the exothermic heat from adjacent foamed sections, the heater 13 is shaped so that as sheets 1 and 3 are induced toward take-up rolls 12, coating material on each side of the midpoint are heated progressively by the heater 13 and progressively produce foam. By the process here described the foaming action is controlled so that an area near the mid-point of the sheet is sealed off and as the rising foam on either side of the mid-point contacts sheet 3 the air previously in the "tunnel" is progressively expelled sidewardly toward the ends of each "tunnel" or corrugation and the corrugation is filled with foam. Heaters of many types and configurations may be used, provided the basic principle of this invention is followed. For example, as an alternate to heater 13 a straight line heater from point A to point B in FIGURE 2 would produce satisfactory results.

In another embodiment of the invention, an apparatus such as shown in FIGURES 1-4 is modified by substituting for the heater 13 one or more heat lamps focused to direct the heat to a small portion of the width of the sheet. A single lamp may be focused at a spot spaced from the edge of the sheet. The lengthwise position of the air-expelling source of heat must be between the position at which the coating is applied to the sheet 1 and the position at which the foaming materials have already foamed more than 50% of the maximum spacing between sheet materials. If the sheet material 3 is of sufficient weight and if the foam is properly metered, it is not necessary to apply a pressure plate to hold sheet 3 in contact with sheet 1 as the foam fills the corrugation. In other cases it may be desirable to employ a pressure device such as a continuous belt having raised ribs corresponding to the corrugation. Because the foam pressure is significant, the combination of a slide plate 15 (or rollers) and a belt 16 may be utilized, as shown in FIGURE 1.

In another modification of the apparatus of FIGURES 1–4, the open end of the V-shaped heater is adjacent to the corrugating roll and the pointed end of the V-shaped heater is toward the take-up reel, and the upper sheet is provided with vent holes. In this case the foam is induced to rise in the corrugation at the edge of the sheet and in effect sealing the ends of the "tunnel" or corrugation. As the raising of the foam is controlled to progressively foam in each corrugation towards the mid-point of the "tunnel" or corrugation, the air is pushed ahead of the rising foam. Inasmuch as the upper sheet has one or more small holes provided near the mid-point of each corrugation "tunnel," the air is readily vented.

*Example 2*

As shown schematically in FIGURES 5 and 6 a lower section 24 of a casting mold is provided with temperature controlling elements 19—20 and 21—22 which may be coils through which heated or cooled liquids can be circulated to produce predetermined temperatures adjacent to the temperature controlling elements and establish a desired temperature gradient between them. In a mold having the contour shown, the foam forming chemical mixture would flow into the lowest part of the cavity, adjacent to 19—20 in FIGURE 6 and, in the absence of temperature controlling elements, uncontrolled foaming action induced by chemical reaction and exothermic heat would cause the foam to rise rapidly from the deepest section, contacting an upper section 25 and entrapping air in the section above 21—22. With the temperature controlling elements in the mold and a heated liquid, such as water at 200° F., circulating through element 21—22 while a cool liquid, such as water at 80° F. circulates through element 19—20 a temperature gradient is established between these elements which induces the foamable mixture nearest element to 21—22 to foam first so that the flow pattern of the rising foam is such that the space above element 21—22 is completely filled without entrapping air and the other parts of the mold are filled progressively with the air in the mold being vented outwardly through the space between the proximate surfaces of the sections 24 and 25 of the mold.

It should be noted that the method of the present invention involves the utilization of a temperature front, advancing from the predetermined zone of initial heating toward other areas, whereby the polyurethane foam rises to meet an upper surface and the rising foam expels the air, following the pattern of the advancing temperature front. Vents for the expelled air are provided at the ends of the paths of the advancing temperature fronts. By the control of the foaming reaction to achieve the progressive foaming in the successive zones following the pattern of the advancing temperature front or fronts, the air is expelled and vented in such a manner that the formation of cavities is prevented. The method includes the steps of mixing a foam-forming composition by bringing together a polyol, an organic diisocyanate, water, catalyst, and, if necessary, appropriate modifying agents such as water soluble silicones. Such foam-forming compositions generally develop a creaming appearance within about 5 to 20 seconds, and generally rise to their maximum height within about 30 to 300 seconds. The application of the heat to initiate the temperature front must be accomplished prior to the attainment of a level half as high as the maximum rise expected, and is desirably provided prior to the development of significant creaming. The chemical reactions whereby the foam-forming composition is transformed into a foam structure having significant mechanical strength generate significant heat, so that many structures can be manufactured by utilizing the temperature front attributable to the heat generated in the progressively advancing front of most exothermic chemical reaction. Thus a temperature front can advance from a zone of initial foaming, so that the externally applied heat may only be necessary at said initial zone. In an apparatus as shown in FIGURES 1 to 4, in which corrugated paper filled with polyurethane foam is manufactured at a very rapid rate, it is desirable to apply the controlled heat at a plurality of points, as is accomplished by the V-shaped heater 13. In the mold shown in FIGURES 5 and 6, the temperature front advances from the zone of initial heating primarily by reason of the exothermic reaction of foam formation.

A polyurethane foam may be prepared by mixing 82 parts of tolylenediisocyanate, 100 parts of 2000 molecular weight polypropylene etherglycol, 3 parts of water, 0.7 part of triethylenediamine, and 0.5 part of water soluble silicone oil.

Various modifications of the invention are possible without departing from the concepts set forth in the appended claims.

The invention claimed:

1. The method of manufacturing a product from foam-forming chemicals without the formation of adverse cavities which includes the steps of: applying foam-forming chemicals to the top surface of an advancing lower sheet; advancing an upper sheet spaced slightly above the coating of chemicals on the lower sheet, said sheets being advanced at the same forward speed; advancing the sheets into a zone in which a heater applies heat only to a middle portion of the advancing sheets, whereby the foam at the middle rises for bonding to the upper sheet; and advancing the sheets through a zone in which said heater applies heat to portions increasingly closer to the edges of the sheets, whereby a temperature front moves from such middle portion toward the edges so that air is effectively vented away from the rising foam without any entrapment of air in the foam.

2. The method of manufacturing a polyurethane foam sandwich which includes the steps of: mixing a polyol, an organic diisocyanate, water, and a catalyst to prepare a foam-forming composition; applying said foam-forming composition to an advancing lower sheet; advancing an upper sheet at the same speed as the lower sheet and spaced sufficiently close to the lower sheet that the rising foam can rise to contact and bond with the upper sheet; advancing the sheets into a zone in which a heater applies heat to a middle portion of the advancing sheets to accelerate the foam-forming reactions at such middle portion and to bring about the bonding of the rising foam to the upper sheet at such middle portion prior to edge portions; advancing the sheets through a zone in which said heater applies heat to portions increasingly closer to the edges, whereby a temperature front advances from such middle portion toward the edge portions so that the rising foam expels the air from between the upper and lower sheets, whereby no air is entrapped in the foamed product.

References Cited in the file of this patent
UNITED STATES PATENTS

| | | |
|---|---|---|
| 1,852,886 | Jones | Apr. 5, 1932 |
| 2,841,205 | Bird | July 1, 1958 |
| 2,895,166 | MacMillan | July 21, 1959 |
| 2,957,207 | Roop et al. | Oct. 25, 1960 |